US008095312B2

(12) United States Patent
Trautenberg et al.

(10) Patent No.: US 8,095,312 B2
(45) Date of Patent: Jan. 10, 2012

(54) DEVICE AND METHOD FOR ORBIT DETERMINATION AND PREDICTION OF SATELLITES PROVIDING SIGNALS TO USERS

(75) Inventors: Hans L. Trautenberg, Ottobrunn (DE); Michael Kirchner, Munich (DE)

(73) Assignee: Astrium GmbH, Munich (DE)

( * ) Notice: Subject to any disclaimer, the term of this patent is extended or adjusted under 35 U.S.C. 154(b) by 253 days.

(21) Appl. No.: 12/181,750

(22) Filed: Jul. 29, 2008

(65) Prior Publication Data
US 2009/0204324 A1    Aug. 13, 2009

(30) Foreign Application Priority Data
Jul. 30, 2007    (EP) .................................... 07014887

(51) Int. Cl.
*G01C 21/00* (2006.01)
*G01S 19/01* (2010.01)
(52) U.S. Cl. .................... 701/226; 342/357.39
(58) Field of Classification Search ............... 701/226; 342/357.3, 357.32, 357.35, 357.39
See application file for complete search history.

(56) References Cited

U.S. PATENT DOCUMENTS
5,558,305 A * 9/1996 Surauer et al. ............... 244/171
2007/0161404 A1 * 7/2007 Yasujima et al. ............ 455/557

FOREIGN PATENT DOCUMENTS
FR    2 784 472 A1    4/2000

OTHER PUBLICATIONS

MIMOSA—A Satellite measuring orbital and attitudinal accerations caused by non-gravitational forces L. Shenal et al., Adv. Space Res. Vo. 23, No. 4, pp. 705-714, 1999, Published by Elsevier Science Ltd.*
European Search Report dated Sep. 21, 2007 (seven (7) pages).
Kang et al, "Precise orbit determination for GRACE using accelerometer data", Advances in Space Research, Pergamon, Oxford, GB, vol. 38, No. 9, pp. 2131-2136, Nov. 11, 2006.
Visser P N A M, Van Den Ijssel, "Verification of CHAMP Accelerometer Observations", Advances in Space Research, Pergamon, Oxford, GB, vol. 31, No. 8, 2003, pp. 1905-1910.

* cited by examiner

*Primary Examiner* — James Trammell
*Assistant Examiner* — Muhammad Shafi
(74) *Attorney, Agent, or Firm* — Crowell & Moring LLP

(57)    ABSTRACT

A device and method for orbit prediction of satellites are provided. An accelerometer measures non-gravity forces acting on a satellite. A processor receives measured non-gravity forces from the accelerometer, estimates the contributions of the measured non-gravity forces to the movement of the satellite, and predicts the orbit of the satellite based on the estimated contributions of the non-gravity forces to the movement of the satellite.

20 Claims, 1 Drawing Sheet

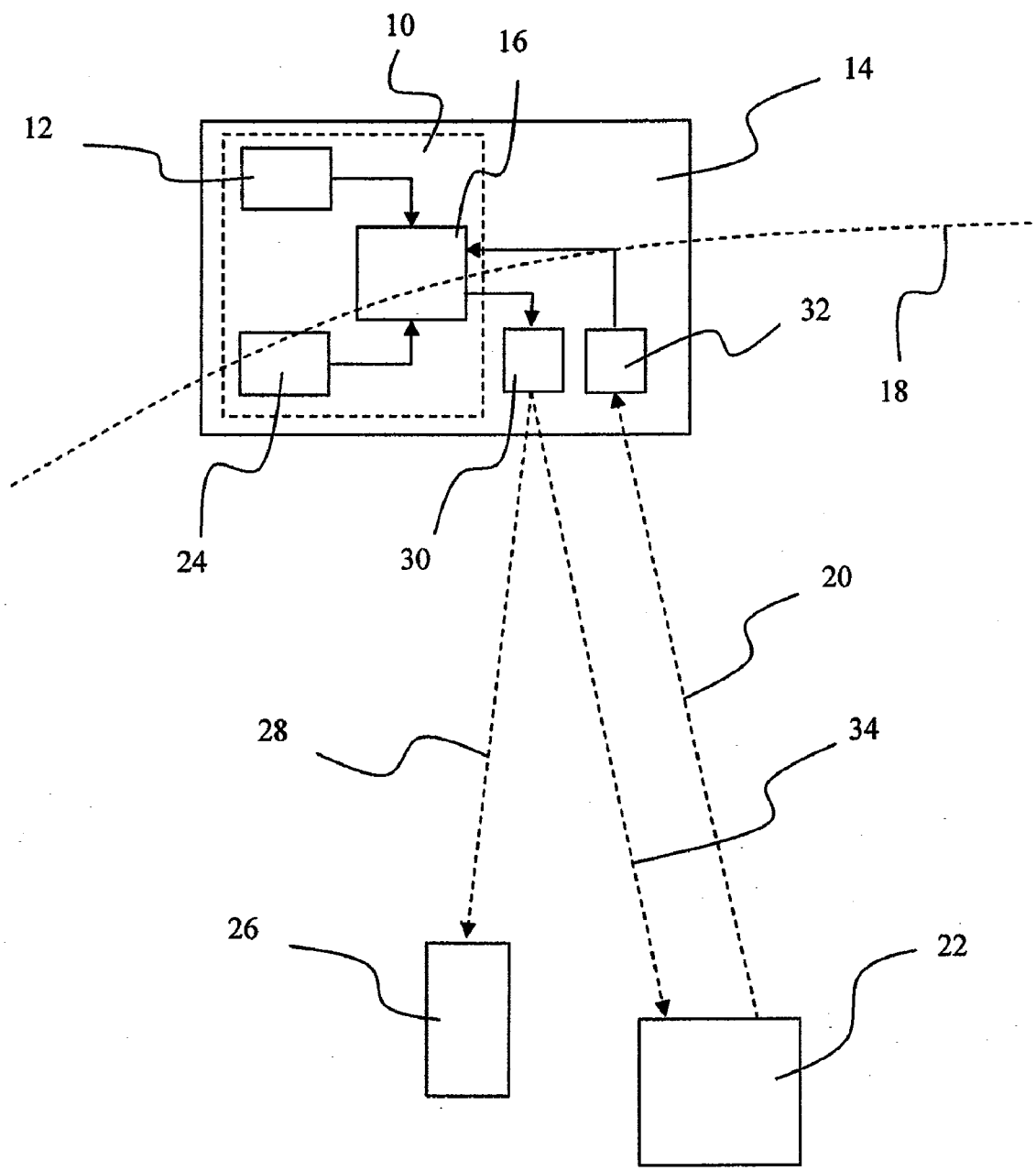

DEVICE AND METHOD FOR ORBIT DETERMINATION AND PREDICTION OF SATELLITES PROVIDING SIGNALS TO USERS

CROSS REFERENCE TO RELATED APPLICATIONS

This application claims priority under 35 U.S.C. §119 to European Patent Application No. 07014887, filed Jul. 30, 2007, the entire disclosure of which is herein expressly incorporated by reference.

BACKGROUND AND SUMMARY OF THE INVENTION

The invention relates to a device and a method for orbit determination and prediction of satellites, particularly of navigation satellites.

Satellite systems for navigation (GNSS; GNSS=Global Navigation Satellite System) allow accurate determination of a position on Earth or in the air. GNSS, such as, for example, the European satellite navigation system Earth-based Galileo comprise a plurality of satellites and an Earth-based control system comprising several control stations.

The accuracy of a GNSS depends on several parameters, one of which is the quality of the knowledge of the orbit of each satellite. In order to determine and predict the orbit of a satellite, principal orbit modeling is usually performed by applying the theory of gravity and estimating non-gravity forces. It is difficult to model the non-gravity forces. While these forces can be empirically estimated for orbit determination using any kind of measurements, they significantly limit the accuracy in case of orbit prediction.

Non-gravity forces include, for example, solar radiation pressure, air drag of the Earth's atmosphere, thrusters forces, Earth infrared radiation, magnetic interaction with the Earth's magnetosphere and ionosphere. While the magnitude of these forces might be negligible for orbit propagation of many satellite missions, it is not for navigation satellites where a precise orbit prediction is essential.

In the state-of-the-art orbit determination, non-gravity forces are usually treated in a way that an empirical model is fit to the observation residuals after all gravity forces have been subtracted. The empirical model is usually defined in a way that a best fit is obtained and the remaining residuals are very small.

This, however, has the drawbacks that the empirical model is not at all related to the physical nature of the effects; the different non-gravity forces are not treated independently which makes a meaningful interpretation of respective results impossible; and, most significantly, an extrapolation of the empirical model parameters, which is necessary for orbit prediction, is poor and unstable.

Therefore, it is an object of the present invention to provide an improved device and an improved method for orbit prediction of satellites, particularly of navigation satellites.

One aspect of the present invention comprises the application of an accelerometer in a satellite, wherein the accelerometer is provided and adapted to measure the non-gravity accelerations acting on the satellite. The measurements may be used to estimate the contributions of non-gravity accelerations to the movement of a satellite, particularly during the orbit determination process. The accuracy which can be achieved for the acceleration measurements may be in the order of about 1E-8 to about 1E-9 with very limited effort. Even an accuracy of about 1E-10 might be reachable with acceptable effort. Thus, the orbit prediction may be significantly improved over the prior art.

According to an embodiment of the invention, a device for orbit prediction of satellites, particularly of navigation satellites, is provided, wherein the device comprises an accelerometer that measures non-gravity accelerations acting on a satellite, and a processor. The processor receives measured non-gravity accelerations from the accelerometer, estimates the contributions of the measured non-gravity accelerations to the movement of the satellite, and predicts the orbit of the satellite based on the estimated contributions of the non-gravity accelerations/forces to the movement of the satellite.

The precise measurements with the accelerometer and the decoupling from all gravity forces allow a very good estimation of the contributions of non-gravity forces. These estimated contributions may be used to improve the prediction of the satellite orbit.

The processing means may further estimate the contributions of the non-gravity forces to the movement of the satellite during an orbit determination process.

Furthermore, the device may receive satellite attitude data, and the processor determines artificial effects introduced by attitude maneuvers of the satellite based on the received satellite attitude data, and accounts for the determined artificial effects during the estimation of the contributions of the non-gravity forces to the movement of the satellite.

The satellite attitude data allows more precise processing of accelerometer measurements by including the satellite's attitude in the processing, particularly in order to remove artificial effects which are introduced by attitude maneuvers and may influence the accuracy of orbit prediction, especially when the accelerometer is placed off the center of mass of the satellite.

Those satellite attitude data are usually available from the satellite control agency. Thus, the device may also receive a signal containing the satellite attitude data from a satellite control agency. Then, the agency may prepare and transmit a signal containing satellite attitude date for correcting the satellite's orbit.

In case the accuracy of these data is not sufficient, the accelerometer might be combined with a gyroscope. Thus, the device may comprise a gyroscope that measures rotation forces acting on the satellite, and the processor receives measured rotation rates from the gyroscope, and determines artificial effects introduced by attitude maneuvers of the satellite based on the received measured rotation rates if the accuracy of satellite attitude data received from the satellite control agency is not sufficient. This allows to further improve the accuracy of orbit prediction particularly in the case of attitude maneuvers.

The device may also use the estimated non-gravity contributions to the satellite's movement determined during the orbit determination process for the orbit prediction and/or the generation of the navigation message for the user.

According to the invention, the processor of the device may be part of a satellite or part of one or several locations on ground.

The device may also compare the measured non-gravity forces with non-gravity forces used in the orbit prediction to generate the user message, and trigger an integrity alert for the ranging signals emitted by the satellite if the result of the comparison is larger than a predefined threshold. The integrity alert may be either autonomously sent by the satellite to the users or sent to the processing facility which incorporates this information in the integrity data flow.

Briefly summarized, measured non-gravity forces may be compared with the non-gravity forces used in the orbit prediction for generation of the user message of the satellite, and detected differences may be used to trigger integrity alerts. The integrity alerts may be, for example, received by a navigation device and used to warn a user of the navigation device about an inaccuracy in the navigation.

The invention also provides a navigation satellite used in a global navigation satellite system and comprising a device of the invention for accurately predicting the orbit of the navigation satellite. For example, the navigation satellite may be particularly adapted to be applied with Galileo.

The navigation satellite may autonomously signal to a user equipment a mis-fit of a maneuver prediction and execution, and send out integrity alert messages in case of mis-fits. This allows implementing a GNSS with a high degree of integrity since users may be warned about inaccurate navigation signals from each satellite. The integrity alert messages may be, for example, processed in a navigation device and cause a change of processing of satellite signals, for example, to switch to processing satellite signals from another satellite which did not send out integrity alert messages.

The invention also involves a method for orbit prediction of satellites, particularly of navigation satellites. The method includes measuring non-gravity accelerations acting on a satellite with an accelerometer, receiving measured non-gravity accelerations from the accelerometer, estimating the contributions of the measured non-gravity accelerations/forces to the movement of the satellite, and predicting the orbit of the satellite based on the estimated contributions of the non-gravity forces to the movement of the satellite.

A computer program may be provided, which is enabled to carry out the above method according to the invention when executed by a computer.

According to a further embodiment of the invention, a record carrier storing a computer program according to the invention may be provided, for example a CD-ROM, a DVD, a memory card, a diskette, or a similar data carrier suitable to store the computer program for electronic access and execution by a computer.

These and other aspects of the invention will be apparent from and elucidated with reference to the embodiments described hereinafter.

The invention will be described in more detail hereinafter with reference to exemplary embodiments. However, the invention is not limited to these exemplary embodiments.

In the following, functionally similar or identical elements may have the same reference numerals. In the following description, absolute values may be contained. These absolute values are only exemplary values and do not restrict the scope of the present invention.

Other objects, advantages and novel features of the present invention will become apparent from the following detailed description of the invention when considered in conjunction with the accompanying drawings.

BRIEF DESCRIPTION OF THE DRAWINGS

The sole Figure illustrates a schematic view of a navigation satellite 14 comprising an integrated embodiment of the device 10 for orbit prediction of the satellite.

DETAILED DESCRIPTION OF THE DRAWINGS

The device 10 comprises an accelerometer 12 that measures accelerations caused by non-gravity forces, such as solar radiation pressure, air drag of the Earth's atmosphere, thruster forces, Earth infrared radiation, magnetic interaction with the Earth's magnetosphere and ionosphere etcetera. These non-gravity forces may act on the satellite 14 and cause measurable accelerations. The accelerometer 12 is sensitive enough in order to measure some or the multitude these forces. The accelerometer 12 may be, for example, a micromechanical acceleration sensor with an integrated sensor signal processing electronic, which amplifies small sensor signals caused by small acceleration forces acting on the satellite.

The device 10 further comprises a gyroscope 24 which measures rotations of the satellite 14. These rotations are usually caused by attitude maneuvers of the satellite 14. These maneuvers cause rotations, which may introduce artificial effects influencing the measurement of accelerations and/or the prediction of the satellite's orbit 18, especially when the accelerometer 12 is placed off the center of mass of the satellite 14. Therefore, the artificial effects introduced by such maneuvers may influence the accuracy of the orbit prediction and, thus, should be taken into account when an orbit prediction is performed. If the accuracy of the attitude data received with a signal 20 from the satellite control agency 22 is not sufficient, the rotation forces measured with the gyroscope 24 may be considered when processing the accelerometer measurements to perform an orbit prediction.

The measurement signals from the accelerometer 12 and from the gyroscope 24 are supplied to processing means 16 such as a microprocessor, programmed to perform a processing of the received measurements and to perform an orbit prediction. The processing means 16 estimate the contributions of the measured non-gravity accelerations/forces to the movement of the satellite 14 from the received measurement signals, and predict the orbit 18 of the satellite 14 based on the estimated contributions of the non-gravity forces to the movement of the satellite 14.

The precise measurements of the accelerations of the satellite 14 and the de-coupling from all gravity forces allow a very accurate estimation of the non-gravity accelerations/forces by the processing means 16. This allows deriving parameters during the processing of the measurements, and particularly during the determination and prediction of the satellite orbit 18, wherein these parameters may be used to improve the prediction of the satellite orbit 18 by the processing means 16. When the processing means 16 have finished the process of orbit determination and/or prediction, they may prepare a user message 34 containing the processed orbit prediction, which is forwarded from the processing means 16 to a radio signal sender unit 30 for transmission to the satellite control agency 22 or to the user.

In another aspect of the invention the measurements themselves are transmitted to the satellite control agency and the processing is done at the control agency.

Processing means 16 may compare the measured non-gravity accelerations with the non-gravity forces used in the prediction for a user message. When the processing means 16 detect a difference of the two non-gravity forces, they may trigger an integrity alert which may be transmitted as a integrity alert message 28 to a user equipment 26, for example, a portable navigation device, which may warn a user of the device upon receipt of the message 28 about possible inaccuracies during the navigation.

In another embodiment of the invention this processing does not take place in the satellite, but instead at one or several locations on ground which process the acceleration and rotation measurements transmitted by the satellite. This transmission may take place dissimilar from the frequency used by the user.

In the following, some advantages of the present invention over the prior art are summarized. Using acceleration measurements according to the present invention, non-gravity forces acting on a satellite can be determined with a precision of approximately 1E-9. This may improve the orbit determination since a weak estimation of specific parameters is replaced by actual measurements of these parameters. This can also improve the orbit prediction because for each of those forces an adequate model can be defined having a meaningful physical relation. Finally, this can improve satellite maneuvers (orbit maneuvers or attitude change) which are scheduled with a specific accuracy can be checked immediately. Potential differences of the executed maneuvers with regard to the planned maneuver can be considered for the orbit modeling. The satellite can also autonomously inform user equipment, such as a portable navigation device, about the mis-fit of maneuver prediction and execution, and hence the degraded orbit accuracy or autonomously correct for the mis-fit in the disseminated user message.

Another benefit is detection of unpredicted effects, such as maneuver execution by accident, space particle or debris collisions causing mis-orientation or small orbit shifts. In these cases the satellite may be able to warn user equipment that the integrity of the provided service cannot be guaranteed.

REFERENCE NUMERALS

10 Device for orbit prediction of satellites
12 accelerometer
14 satellite
16 processing means
18 orbit of the satellite 14
20 signal containing satellite attitude data
22 satellite control agency
24 gyroscope
26 user equipment
28 integrity alert message
30 radio signal sender unit
32 radio signal receiver unit
34 user message containing the processed orbit prediction The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A device that predicts satellite orbits, comprising:
an accelerometer that measures non-gravity forces acting on a satellite, and
a processor programmed to receive measured non-gravity accelerations/forces from the accelerometer, estimate the contributions of the measured non-gravity accelerations/forces to the movement of the satellite, and predict the orbit of the satellite based on the estimated contributions of the non-gravity forces to the movement of the satellite.

2. The device of claim 1, wherein the processor is programmed to estimate the contributions of the non-gravity forces to the movement of the satellite during an orbit determination process.

3. The device of claim 1, wherein the device receives satellite attitude data, and wherein the processor is programmed to determine artificial effects introduced by attitude maneuvers of the satellite based on the received satellite attitude data, and account for the determined artificial effects during the estimation of the contributions of the non-gravity forces to the movement of the satellite.

4. The device of claim 3, wherein the device receives a signal containing the satellite attitude data from a satellite control agency.

5. The device of claim 4, further comprising:
a gyroscope that measures rotations of the satellite,
wherein the processor is programmed to receive measured rotations from the gyroscope, and determine artificial effects introduced by attitude maneuvers of the satellite based on the received measured rotations when the accuracy of satellite attitude data received from the satellite control agency is not sufficient.

6. The device of claim 1 wherein the device uses the estimated non-gravity contributions to the satellite's movement determined during the orbit determination process for the orbit prediction and the generation of the navigation message for the user.

7. The device of claim 1, wherein the processor is part of a satellite.

8. The device of claim 1 wherein the processor is part of one or several locations on ground.

9. A device that predicts satellite orbits, comprising:
an accelerometer that measures non-gravity forces acting on a satellite, and
a processor programmed to receive measured non-gravity accelerations/forces from the accelerometer, estimate the contributions of the measured non-gravity accelerations/forces to the movement of the satellite, and predict the orbit of the satellite based on the estimated contributions of the non-gravity forces to the movement of the satellite, wherein the processor is programmed to compare the measured non-gravity forces with non-gravity forces used in the orbit prediction for generating the user message, and trigger an integrity alert for a satellite ranging signal when the result of the comparison is larger than a predefined threshold.

10. A navigation satellite comprising:
an accelerometer that measures non-gravity forces acting on a satellite; and
a processor programmed to receive measured non-gravity accelerations/forces from the accelerometer, estimate the contributions of the measured non-gravity accelerations/forces to the movement of the satellite, and predict the orbit of the satellite based on the estimated contributions of the non-gravity forces to the movement of the satellite, wherein the navigation satellite is part of a global navigation satellite system.

11. The navigation satellite of claim 10, wherein the satellite autonomously signals to user equipment a mis-fit of a maneuver prediction and execution and to send out integrity alert messages in case of mis-fits.

12. A device that predicts satellite orbits, comprising:
an accelerometer for measuring non-gravity forces acting on a satellite, and a processor configured to receive measured non-gravity accelerations/forces from the accelerometer, estimate the contributions of the measured non-gravity accelerations/forces to the movement of the satellite, and predict the orbit of the satellite based on the estimated contributions of the non-gravity forces to the movement of the satellite.

13. The device of claim 12, wherein the processor is further configured to estimate the contributions of the non-gravity forces to the movement of the satellite during an orbit determination process.

14. The device of claim 12, wherein the device receives satellite attitude data, and wherein the processor is further configured to determine artificial effects introduced by attitude maneuvers of the satellite based on the received satellite attitude data, and account for the determined artificial effects during the estimation of the contributions of the non-gravity forces to the movement of the satellite.

15. The device of claim 14, wherein the device receives a signal containing the satellite attitude data from a satellite control agency.

16. The device of claim 15, further comprising:
a gyroscope that measures rotations of the satellite,
wherein the processor is further configured to receive measured rotations from the gyroscope, and determine artificial effects introduced by attitude maneuvers of the satellite based on the received measured rotations when the accuracy of satellite attitude data received from the satellite control agency is not sufficient.

17. The device of claim 12, wherein the processor is further configured to compare the measured non-gravity forces with non-gravity forces used in the orbit prediction for generating the user message, and trigger an integrity alert for a satellite ranging signal when the result of the comparison is larger than a predefined threshold.

18. The device of claim 12, wherein the device uses the estimated non-gravity contributions to the satellite's movement determined during the orbit determination process for the orbit prediction and the generation of the navigation message for the user.

19. The device of claim 12, wherein the processor is is part of a satellite.

20. The device of claim 12, wherein the processor is part of one or several locations on ground.

* * * * *